US007050936B2

(12) United States Patent
Levy et al.

(10) Patent No.: US 7,050,936 B2
(45) Date of Patent: May 23, 2006

(54) FAILURE PREDICTION APPARATUS AND METHOD

(75) Inventors: Dorron Levy, Givataim (IL); Pierre Gérard Tibika, Tel Aviv (IL)

(73) Assignee: Comverse, Ltd., Tel Aviv (IL)

( * ) Notice: Subject to any disclaimer, the term of this patent is extended or adjusted under 35 U.S.C. 154(b) by 197 days.

(21) Appl. No.: 09/996,789

(22) Filed: Nov. 30, 2001

(65) Prior Publication Data

US 2003/0046026 A1 Mar. 6, 2003

Related U.S. Application Data

(60) Provisional application No. 60/317,181, filed on Sep. 6, 2001.

(51) Int. Cl.
*G06F 17/00* (2006.01)

(52) U.S. Cl. ............. 702/181; 702/179; 702/183; 702/185

(58) Field of Classification Search ........ 702/181–188, 702/81, 179, 193, 56, FOR. 134, FOR. 135, 702/FOR 137, FOR. 139, FOR. 170, FOR. 171; 703/2, 6, 13, 22; 706/903–908, 910, 911–918, 706/922, 932, 25, 21; 700/51, 79, 80; 714/1, 714/25, 37, 38, 42, 46, 47; 717/124, 126, 717/127
See application file for complete search history.

(56) References Cited

U.S. PATENT DOCUMENTS

| | | | | |
|---|---|---|---|---|
| 5,210,704 A | * | 5/1993 | Husseiny | 702/34 |
| 5,586,066 A | * | 12/1996 | White et al. | 702/181 |
| 5,654,896 A | | 8/1997 | Ochi | 716/4 |
| 5,655,074 A | * | 8/1997 | Rauscher | 714/38 |
| 5,720,003 A | * | 2/1998 | Chiang et al. | 706/21 |
| 5,987,399 A | * | 11/1999 | Wegerich et al. | 702/183 |
| 5,991,707 A | | 11/1999 | Searles et al. | 702/185 |
| 6,073,089 A | * | 6/2000 | Baker et al. | 702/185 |
| 6,182,022 B1 | * | 1/2001 | Mayle et al. | 702/182 |
| 6,249,887 B1 | | 6/2001 | Gray et al. | 714/47 |
| 6,601,014 B1 | * | 7/2003 | Dempsey | 702/179 |

OTHER PUBLICATIONS

Harper Perennial, New York, John L. Casti, Complexification, "Explaining a Paradoxical World Through the Science of Surprise", first published 1994, pp. 242, 243, no month.
Butterworths Scientific Publications, London, edited by Willis Jackson, Communication Theory, Papers read at a Symposium on "Applications of Communication Theory" held at the Institution of Electrical Engineers, London, Sep. $22^{nd}$-$26^{th}$ 1952, pp. 486-502.

* cited by examiner

*Primary Examiner*—Hal Wachsman
(74) *Attorney, Agent, or Firm*—Sughrue Mion, PLLC

(57) ABSTRACT

An apparatus and method for predicting failure in a system is provided having a measurement unit for repeatedly measuring a disorder indicator of the system, and a comparator for comparing obtained measurements of the disorder indicator with a predetermined statistical description of the disorder indicator. The comparison is used to determine whether a deviation is present between presently measured values of the disorder indicator and the statistical description. The apparatus issues a failure prediction upon determination of the presence of such a deviation. The apparatus is able to use routine monitoring of the system and relies on its own statistical analysis of the behavior of the disorder indicator, to provide fault prediction which is non-specific to the type of fault.

26 Claims, 9 Drawing Sheets

FAILURE PREDICTION APPARATUS AND METHOD

RELATED APPLICATION

The present Application claims priority from U.S. Provisional Application Ser. No. 60/317,181 filed on Sep. 6, 2001; the disclosure of which is incorporated herein by reference.

FIELD OF THE INVENTION

The present invention relates to a failure prediction apparatus and method, and more particularly to a failure prediction apparatus and method based on routine monitoring of a system.

BACKGROUND OF THE INVENTION

Computing systems installed around the world are generally customized, at least at the software level, meaning that support and maintenance have to be supplied at an individualized level. Typically, support of customized systems is based on a predefined routine. The system user, or the system itself, reports a failure and the technical support reacts in a certain time frame to analyze and hopefully fix the problem. Unplanned problems and unscheduled maintenance downtime generally disrupt services and are bad for the system user's relations with his customers and with his employees. On the other hand, from the technical support point of view, maintaining a short response time means maintaining a large highly skilled staff which is constantly on call.

In order to avoid unscheduled down time there are a number of systems available which do not rely on the customer reporting a fault. Instead they rely on failure prediction. Successful failure prediction allows necessary downtime to be scheduled, thereby to minimize disruption to the system user. 100% failure prediction is not possible, but if a significant percentage can be predicted early enough then a significant difference can be made.

There are two main approaches in current failure prediction, one is referred to as the bottom up approach and the second is the top down approach. The bottom up approach typically monitors known causes for problems and alerts at a certain, predetermined, threshold. For example, 95% usage of memory may typically be taken as a likely indicator of a failure of the 'not enough memory' type. Likewise, a supply voltage that is too low may be taken as a likely indicator of a specific kind of failure.

The top down approach, by contrast, looks at parameters and ratios that do not point towards a specific failure, but to a general abnormality in the system. Examples are 85% of memory usage when the expected usage for the current external load is 75%, or the temperature of a child. Both are examples of an abnormality which carries the information that something is wrong but does not carry any indication as to what might be wrong. That is to say the chosen indicator can give statistically viable but non-specific failure indications.

The bottom up approach may be realized using an expert system. The expert system knows in advance the causes behind a series of known problems. Following the appearance of a cause it uses decision logic to predict the respective problem. The bottom up approach has four main disadvantages, firstly the number of combinations of fault causes tends to rise rapidly with system complexity, and the prediction system increases in complexity much faster than the system being monitored. Secondly, exact cause-and-effect trees have to be maintained and updated. In reality, many problems do not have causes which are known precisely or are in any way obtainable. For example a problem in a software system may cause system restart and thereby wipe out all records of how it occurred.

Thirdly, a cause generally has to be thresholded to avoid false alarms. The selection of a threshold is typically a compromise between the need to predict the fault sufficiently in advance and the need to avoid false alarms, and there is also the need to avoid cascading of alarms. Cascading of alarms tends to occur when a variable hovers around a threshold, and may cause overloading of the system. Generally, it is very difficult to select a threshold that provides a good compromise and gives both early prediction and a low false alarm rate.

Fourthly, the expert system requires accurate and precise knowledge of the system it is monitoring. Each customized system requires a specifically customized expert system to monitor it.

The top down approach alleviates many of the above problems. A neural network or similar pattern matching technology looks for patterns in the behavior of a system to be tested that are indicative of a fault. The system learns patterns that are typical of normal operation and patterns that are indicative of different types of fault. Following a learning phase, the system is able to provide advance warning of problems that it encountered in its learning phase.

The disadvantage of the top-down approach is that the learning phase needs to include given failure modes in order for the system to learn to recognize it as a failure. Thus, there is both an extended learning period and an inability to deal with not-well-defined phenomena. A major advantage however is that, since learning is automated, the top down approach is able to take in its stride both simple and complex systems. Furthermore, the operator of the system requires little specific system knowledge, but he does need to know about typical faults that do occur and he needs to ensure that such faults appear during the learning period.

There is thus a need for a system that is able to predict faults that are the result of ill-defined or unexpected phenomena. Ideally the system should retain all of the advantages of the top-down system and should be able to dispense with a long training period.

SUMMARY OF THE INVENTION

According to a first aspect of the present invention there is provided an apparatus for predicting failure in a system, the apparatus comprising:

a measurement unit for repeatedly measuring a disorder indicator of the system, and a comparator for comparing obtained measurements of the disorder indicator with a predetermined statistical description of the disorder indicator to determine whether a deviation is present between presently measured values of the disorder indicator and the statistical description, the apparatus being operable to issue a failure prediction upon determination that such a deviation is statistically significant.

Preferably, the measurement unit is operable to measure the disorder indicator via a communication link, thereby to monitor remotely located systems.

The apparatus preferably comprises a statistical unit for building up the statistical description of the disorder indicator using measurements taken via the measurement unit during a training phase of operation of the system.

Preferably, the statistical description comprises an average and a standard deviation.

Preferably, the deviation is considered to be statistically significant when exceeding a threshold of substantially three standard deviations.

Preferably, the apparatus further comprises a deviation thresholder for dynamically setting a threshold deviation level based on the statistical description.

Preferably, the disorder indicator is waste heat.

Additionally or alternatively, the disorder indicator is sound.

Additionally or alternatively, the disorder indicator is waste memory.

Additionally or alternatively, the disorder indicator is a proportion of time spent by the system other than on a given task.

Additionally or alternatively, the disorder indicator is a ratio between system load and system resource usage.

Additionally or alternatively, the disorder indicator is a feature having a power law distribution.

Additionally or alternatively, the feature is a distribution of message types in a computer system fault logger.

Additionally or alternatively, the power law distribution comprises a ranking of sub-features of the feature and a deviation is determinable by the comparator from a change in the ranking of the sub-features in the distribution.

Additionally or alternatively, a deviation is determinable by the comparator from a change in overall quantity of the disorder indicator.

Additionally or alternatively, the disorder indicator is a distribution of failure types and the deviation is a deviation from the Zipf-Estoup rule. As will be discussed in more detail below, the distribution of phenomena appearance in a system behaves according to $1/(rank+const.)^x$.

Preferably, the apparatus further comprises a communication unit for alerting a call center in the event of a failure prediction.

Embodiments are applicable to systems without regard to a level of complexity of the system, since they monitor only predetermined features and the statistical behavior thereof and do not concern themselves with the interior workings of the system.

According to a second aspect of the present invention there is provided a method of failure prediction comprising:

repeatedly measuring a disorder indicator of a system, comparing the disorder indicator with a statistical description of idealized behavior of the feature, determining from the comparison whether a deviation is present in the disorder indicator behavior, and issuing an alert in the event of determination of such a deviation being of statistical significance.

Preferably, the measuring is carried out remotely.

Preferably the method further comprises building up the statistical description of the disorder indicator using measurements taken via the measurement unit during a calibration period of normal operation of the system.

Preferably, the statistical description comprises an average and a standard deviation.

Preferably, the deviation present is at least substantially three standard deviations.

Preferably the method further comprises dynamically setting a threshold deviation level based on the statistical description.

Preferably, the disorder indicator is waste heat.

Additionally or alternatively, the disorder indicator is sound.

Additionally or alternatively, the disorder indicator is waste memory.

Additionally or alternatively, the disorder indicator is a proportion of time spent by the system other than on a given task.

Additionally or alternatively, the disorder indicator is a ratio between system load and system resource usage.

Additionally or alternatively, the disorder indicator is a feature having a power law distribution.

Additionally or alternatively, the feature is a distribution of message types in a computer system fault logger.

Additionally or alternatively, the distribution comprises a ranking of sub-features of the feature and a deviation is determinable from a change in the ranking of the sub-features in the distribution.

Additionally or alternatively, a deviation is determinable from a change in overall quantity of the disorder indicator.

Additionally or alternatively, the disorder indicator is a distribution of failure types and the deviation is a deviation from the Zipf-Estoup rule.

Preferably the method further comprises alerting a call center in the event of a failure prediction.

Embodiments of the method are applicable to a system without regard to a level of complexity of the system.

According to a third aspect of the present invention there is provided a method of failure prediction in an operative system, the method comprising:

selecting a measurable indicator of a level of disorder in the operative system, obtaining a statistical description of behavior of the measurable indicator within the operative system, repeatedly measuring the disorder indicator during operation of the system, comparing the disorder indicator with the statistical description, determining from the comparison whether a deviation is present in the disorder indicator behavior, and issuing an alert in the event of determination of such a deviation being of statistical significance.

According to a fourth aspect of the present invention there is provided a data carrier holding data which when combined with a general purpose computer is operable to provide:

a measurement unit for repeatedly measuring a disorder indicator of an external system, and a comparator for comparing obtained measurements of the disorder indicator with a predetermined statistical description of the disorder indicator to determine whether a deviation is present between presently measured values of the disorder indicator and the statistical description, the combination being operable to issue a failure prediction upon determination that such a deviation is statistically significant.

According to a fifth aspect of the present invention there is provided an apparatus for measuring quality of a digital system, the apparatus comprising:

a measurement unit for repeatedly measuring a disorder indicator of the system, and a comparator for comparing obtained measurements of the disorder indicator with a predetermined statistical description of the disorder indicator to determine whether a deviation is present between presently measured values of the disorder indicator and the statistical description, the apparatus being operable to issue a quality score of the software based on the extent of the deviation.

According to a further aspect of the invention there is provided apparatus for predicting failure in a system, the apparatus comprising:

a measurement unit for repeatedly measuring a disorder indicator of said system, a statistical unit for building up a statistical description of said disorder indicator using measurements taken via said measurement unit during a training phase of operation of said system, and a system thresholder, for using said statistical description to apply thresholds to said disorder indicator to predict system failure.

BRIEF DESCRIPTION OF THE DRAWINGS

For a better understanding of the invention, and to show how the same may be carried into effect, reference will now be made, purely by way of example, to the accompanying drawings, in which.

DESCRIPTION OF THE PREFERRED EMBODIMENTS

Figure 1:
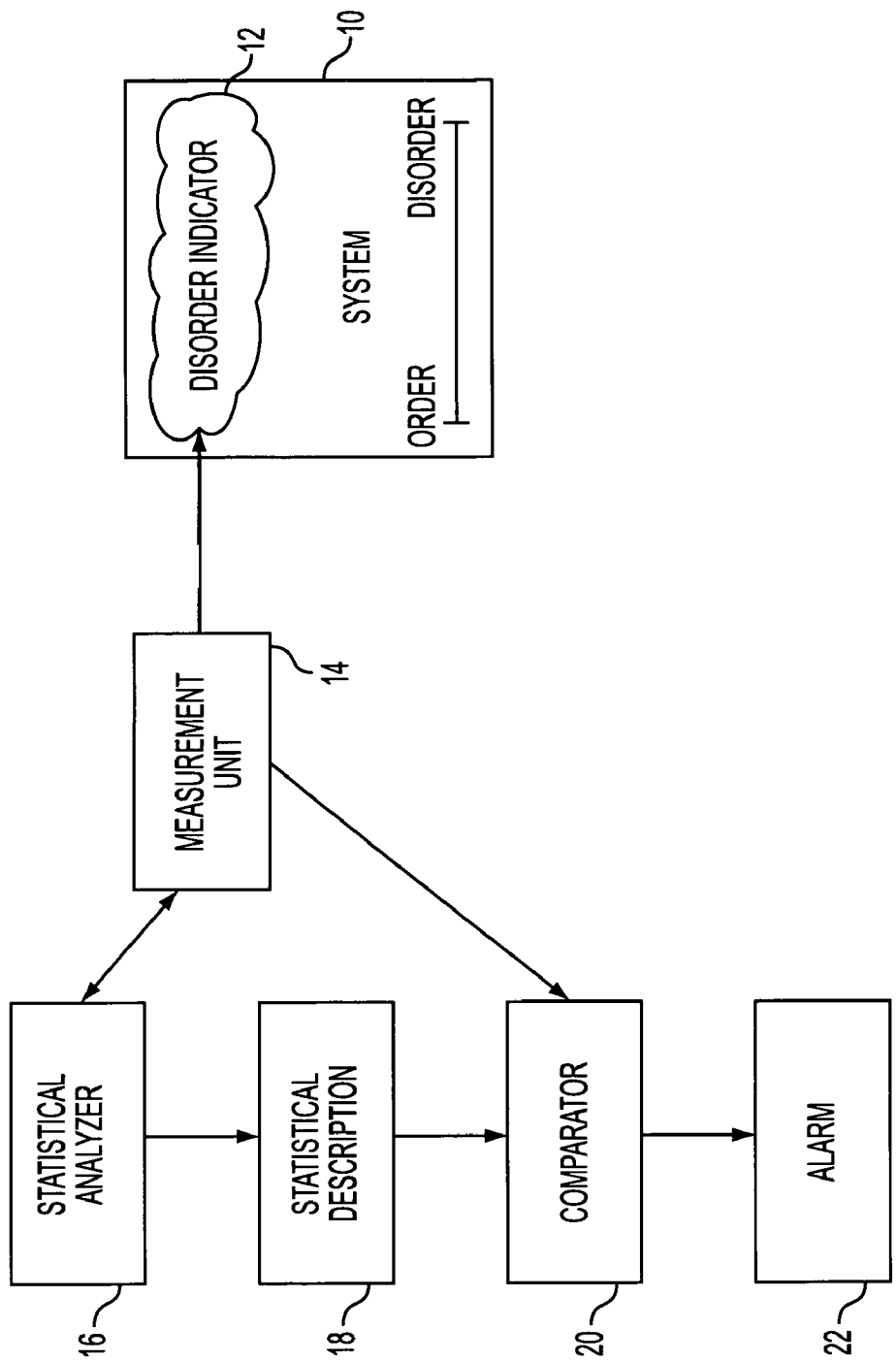
FIG. 1 is a generalized block diagram showing a system being monitored by failure prediction apparatus according to an embodiment of the present invention.

Reference is now made to FIG. 1, which is a generalized block diagram showing apparatus for predicting failure in a system according to a first embodiment of the present invention. In FIG. 1, a system 10, which may be simple or complex, carries out a function or functions for which it was designed. Whilst operating, the system produces waste ("non-designated output") or gives rise to measurable features indicating the level of order or disorder in the system. Depending on the type of system, the waste may be heat or noise or may be measured, for example in terms of success or failure to utilize available resources. Any real life system may have a plurality of features that may be measured and which represent waste, or order or disorder in the system. Generally, it does not matter how efficiently the system is designed, and whether it is working correctly or not, there is always some waste or disorder. However, the amount or behavior of waste feature, or the pattern or extent of the disorder may change depending on how the system is working. Hereinafter reference is made to a disorder indicator as a feature that can be measured to indicate waste or disorder in a system. Such disorder indicator may generally be identified in any system and suitable analysis thereof gives a non-specific forecast of an oncoming failure.

In FIG. 1, the system 10 produces waste which can be represented by a disorder indicator 12. The disorder indicator 12 is preferably measured by a measurement unit 14 and the behavior of that disorder indicator may be used to diagnose the health of the system 10. There is thus provided a statistical analyzer 16 which analyzes the behavior of the disorder indicator over a typically relatively short period of time. The measurement may subsequently be stored in a statistical description unit 18 to serve as statistical model for the next phase of operation, namely monitoring. Having obtained the statistical description, the measurement unit may continue to obtain measurements of the disorder indicator, which are then input to a comparator 20. The comparator compares current statistical behavior of the disorder indicator with the statistical description or model stored in unit 18 and, in the event of a deviation which exceeds a threshold, an alarm 22 is activated. The alarm may serve as a prediction of likely system failure and may be used to alert a call center. Alternatively it may serve as an input to an auto-correction system.

In a preferred embodiment of the present invention the alarm threshold is obtained from the statistical description. In the case of a feature being a variable having a continuous value, the statistical description may simply be a median or a mean and a standard deviation. The alarm threshold may then be set, for example, as three standard deviations. The threshold may be dynamically defined to follow changes in the statistical model. In one preferred embodiment the threshold may be set by the user selecting an acceptable maximum false alarm rate.

Figure 2:
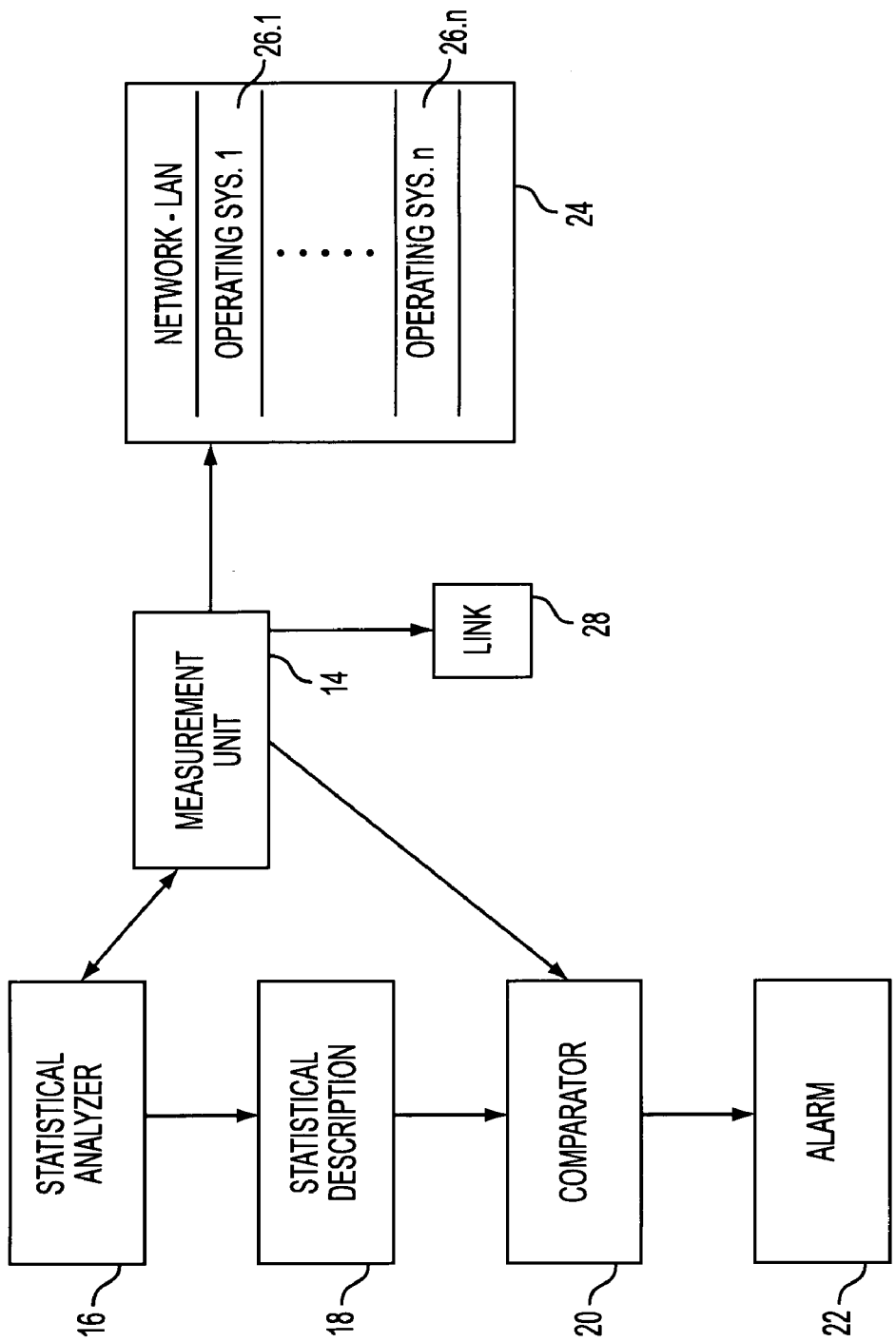
FIG. 2 is a generalized block diagram showing a computer network being monitored by failure prediction apparatus according to the embodiment of FIG. 1.

Reference is now made to FIG. 2, which is a simplified block diagram of a further embodiment of the present invention. Parts that appear in FIG. 1 are given the same reference numerals and are not discussed in detail again except as needed for an understanding of the present embodiment. In FIG. 2, the system is a local area network (LAN) 24 that connects together a plurality of computers each, for example, running separate operating systems. The measurement unit 14 is remotely located from the LAN 24, gathering data from the system via a communication link 28. Preferably, the measurement unit uses only routine data traffic in order to gather sufficient information for regular monitoring of a disorder indicator.

As discussed above, the statistical analyzer requires information regarding normal behavior of the system before alarm thresholds can be set. The monitoring is thus preferably carried out in two phases, a learning or calibration phase and an operational phase. In the learning phase, measurement data is supplied to the statistical analyzer in order to enable it to build up a suitable description of the data. The advantage of the disorder feature measurement over the top down approach mentioned in the background is that the learning phase is short, several hours to a day in the case of a typical system, and there is no need to replicate faults during the learning phase since the precise nature of the fault is not required in the analysis.

The above described method thus learns the normal range of values of the disorder/waste indicator, which is taken as the range over which the indicator can vary before the system predicts a failure. It is then left to the troubleshooter to analyze the significance of the failure prediction. For example the troubleshooter may, due to his knowledge of the system, be more concerned about a deviation at one end of the range than at the other.

The learning phase can be replaced by inserting a predefined statistical model. Alternatively, a hybrid between learning and a predefined model can be used. A statistical model may, for example, be predefined to describe behavior universally regarded as deviant, and then learning may be used to obtain a more refined model of the same feature, or models of additional features as desired. Generally, the calibration phase is carried out upon initial installation and then repeated whenever changes are made to the system.

Figure 3:
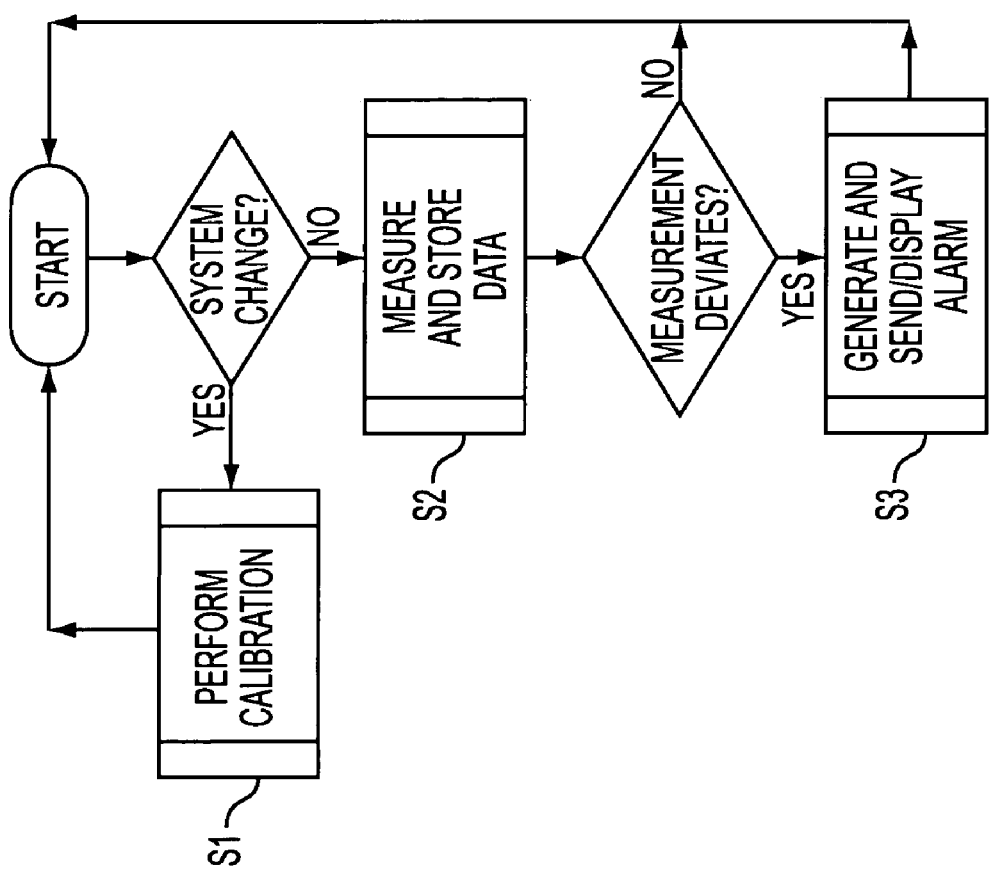
FIG. 3 is a simplified flow chart showing operation of the failure prediction apparatus of FIG. 1.

Reference is now made to FIG. 3, which is a simplified flow diagram showing the operation of the above-described monitoring procedure. The procedure performs learning or calibration, in a calibration stage S1, every time a system change occurs, in order to ensure that the statistical model is consistent with the current state of the system. Regular operation of the monitoring system, namely measuring and storage of data, is carried out in a measure and store data stage S2. In the event of detection of a statistically significant deviation, an alarm is sent or displayed, in an alarm stage S3.

Figure 4:
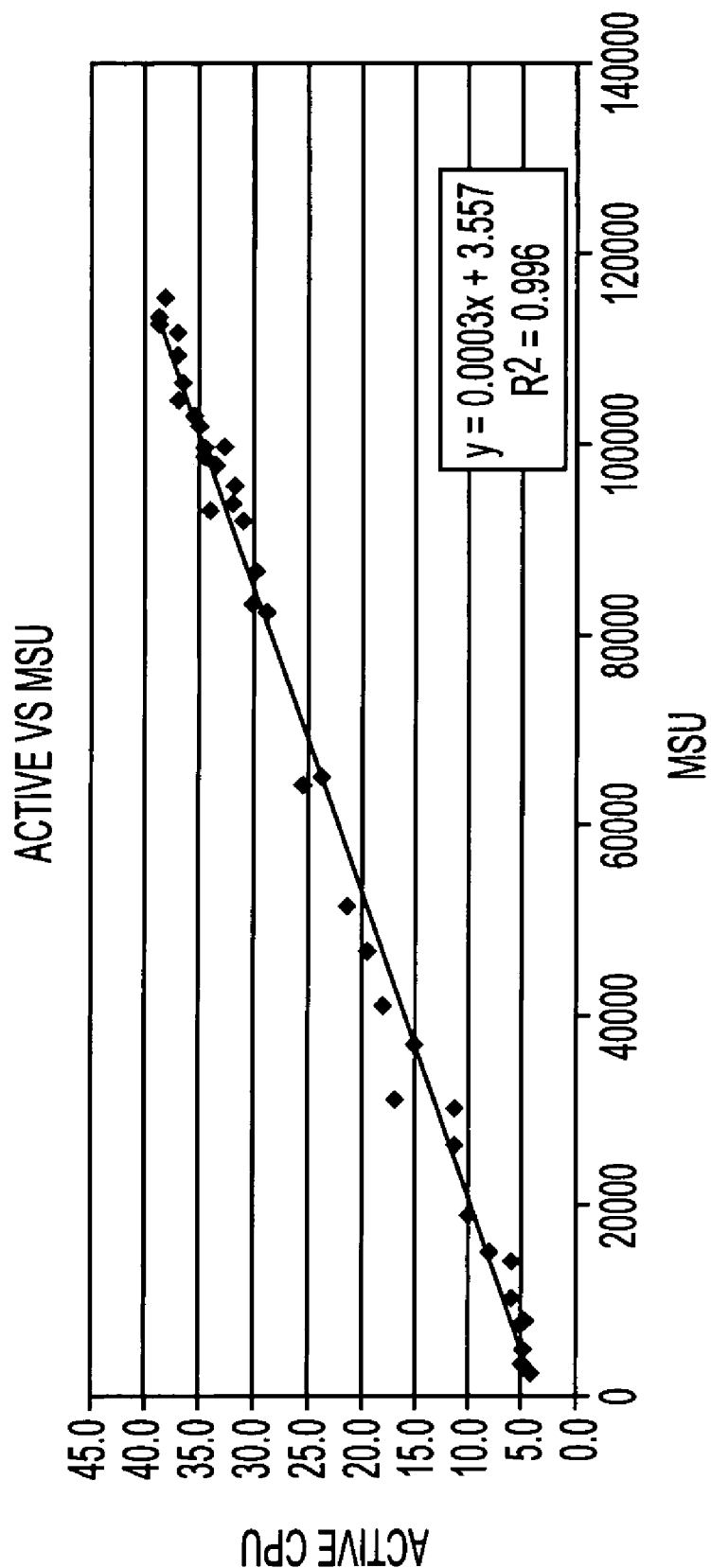
FIG. 4 is a graph showing a relationship between internal and external system load, which relationship may be used as a disorder indication in the system in embodiments of the present invention.

Reference is now made to FIG. 4, which is a graph of internal load against external load for a software-based system, in which internal load may be measured in terms of central processing unit (CPU) activity, and monitoring is carried out, for example over an SS7 communication link. The graph shows internal load (active CPU) against external load measured in terms of messaging signaling units (MSU) processed by the system under test. The graph represents a computer system under normal operating conditions. As shown in FIG. 4, a plot of internal load against external load may typically yield a straight line graph, and thus each MSU level is predictive of a particular active CPU level. It is noted, in explanation of the present graph that, in general, MSU level indicates throughput, in which case Little's Law tells us that the graph is not linear, but exponential. That is to say CPU load goes up exponentially, while throughput increases. However, in the present case, MSU level indicates outside load which is linear.

In the measurement or calibration phase, (S1 in FIG. 3) a graph such as that in FIG. 4 is obtained and then for regular monitoring, (S2 in FIG. 3) both MSU and CPU levels are measured. The MSU level is used to give a prediction of the CPU level, based on the graph. If a statistically significant deviation is found between the measured CPU level and the expected CPU level then an alarm may be set or other remedial action taken.

Figure 5:
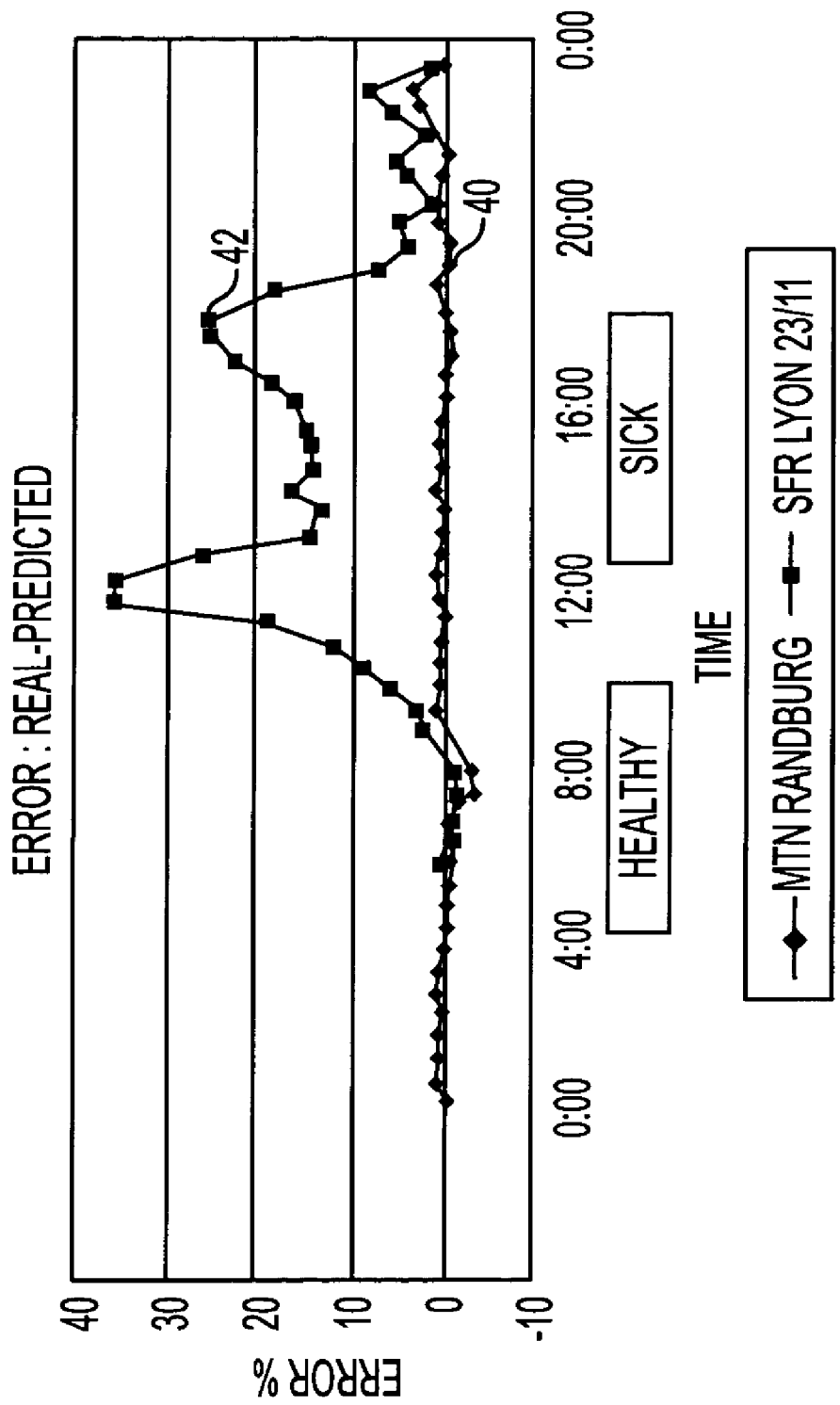
FIG. 5 is a graph showing how deviations in the relationship shown in FIG. 4 can be used to predict system failure.

Reference is now made to FIG. 5, which is a graph showing deviation over time for a monitoring phase. The deviation shown is deviation from the predictions suggested by the graph of FIG. 4, and curves are shown for two similar systems, one healthy and one not. Line 40 represents a system which appears to be healthy in that deviation is minimal. Line 42 represents a system which appears to be unhealthy in that the deviation is large. A system giving results similar to those of line 42 would normally trigger an alarm, allowing maintenance time to be scheduled in advance of serious problems arising.

Figure 6:
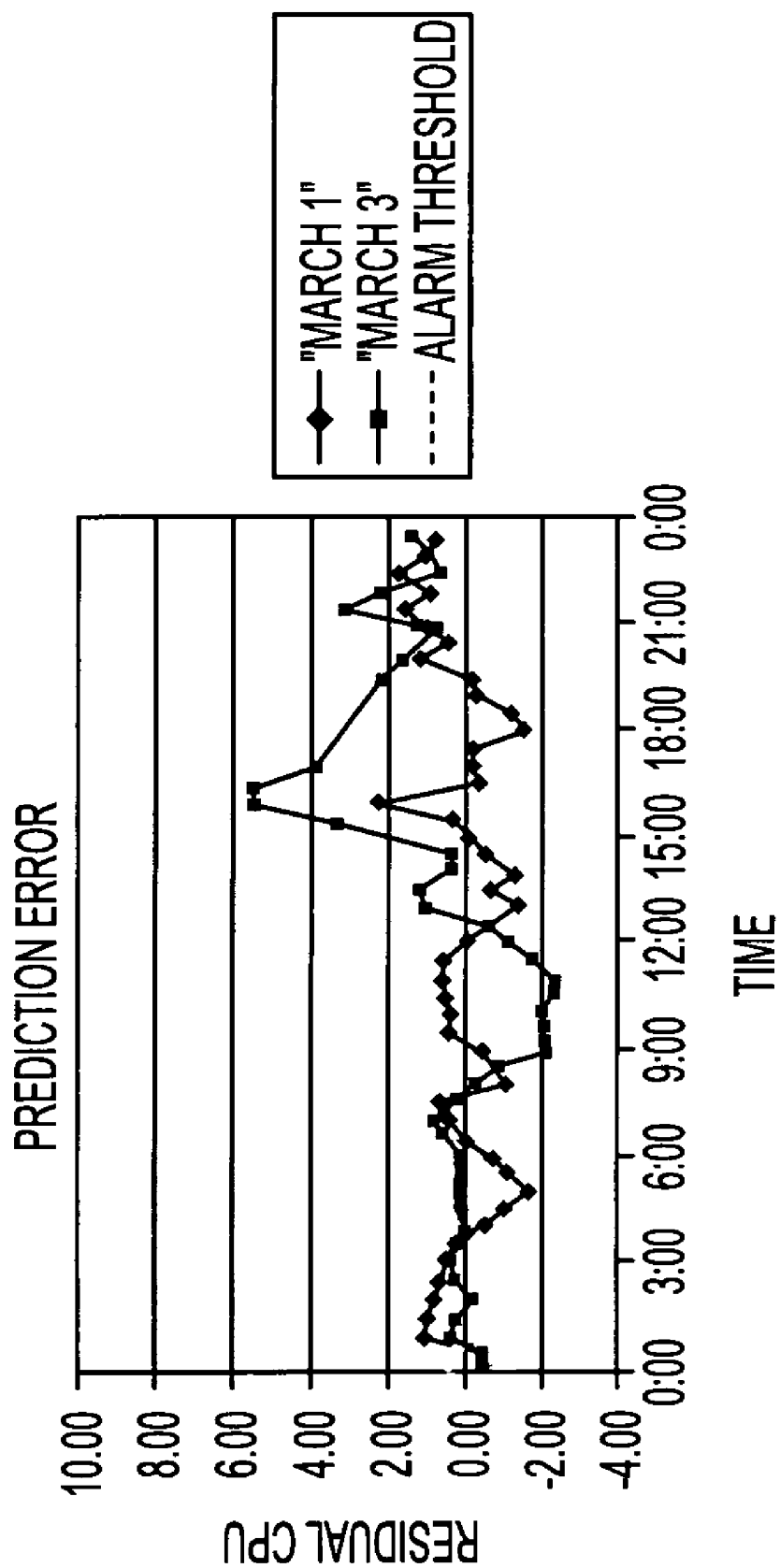
FIG. 6 shows the deviations of FIG. 5 plotted as relative errors against an average level.

Reference is now made to FIG. 6, which shows the same situation as in FIG. 5 except that the prediction error is plotted in terms of residual CPU utilization levels in percentage deviation from the expected level.

In a computer system, aside from CPU utilization, it is often possible to follow external resource usage. A particular system resource that can be indicative of disorder trends in the system is memory usage. If a system suddenly undergoes a major increase in memory usage without any change in system tasks, or assigns, without apparent cause, a higher than usual amount of memory to a particular task, then unsound behavior may be deduced.

In FIG. 2, the system being monitored is a LAN and typical disorder indicators that may be considered include time or other resources being devoted to particular tasks, memory utilization against system load, or even logged faults. In the case of logged faults there is no continuous variable which may be assigned an average or a standard deviation. Instead there is a discrete series of sub-features, such as different fault types. The frequency of appearance of fault types in any given system follows a given pattern, with certain faults appearing very frequently and other faults appearing less frequently. A power law distribution is commonly obeyed in complex systems, and reference is now made to FIG. 7, which is a graph showing such a typical distribution of fault types against number of faults. The distribution in the graph shows that the most common fault is typically twice as common as the next most common, three times as common as the following fault and so on.

Power distributions are typical of failure types generated by faults in complex systems, and a rule defining such a distribution in complex systems is known as the Zipf-Estoup law. As mentioned above, the distribution of phenomena appearance in a system behaves according to $1/(rank+const.)^x$.

A particular case for Zipf is in word distribution random text where x=1 and const=0. The Zipf-Estoup law applied to language states that if I have a list of R words in a language and I rank each word in a list according to its frequency of occurrence, then the probability of occurrence of the rth word in the list is given by $$\frac{1}{r\log(1.78R)}$$

In general, as long as any kind of distribution of events may be discerned, then a ranking can be built up and the frequency of occurrence of different events in the list can be related using an application of the Zipf-Estoup law. Once such a relationship has been established, then a deviation therefrom can be used as a sign of abnormal behavior. Again, no knowledge regarding the system itself, or any individual failure modes, is required. For a more detailed explanation of the Zipf-Estoup law, reference is made to Complexification, Explaining a Paradoxical World Through the Science of Surprise, HarperCollins Publishers 1994—Page 243, John L. Casti, the contents of which are herein incorporated by reference.

Figure 8:
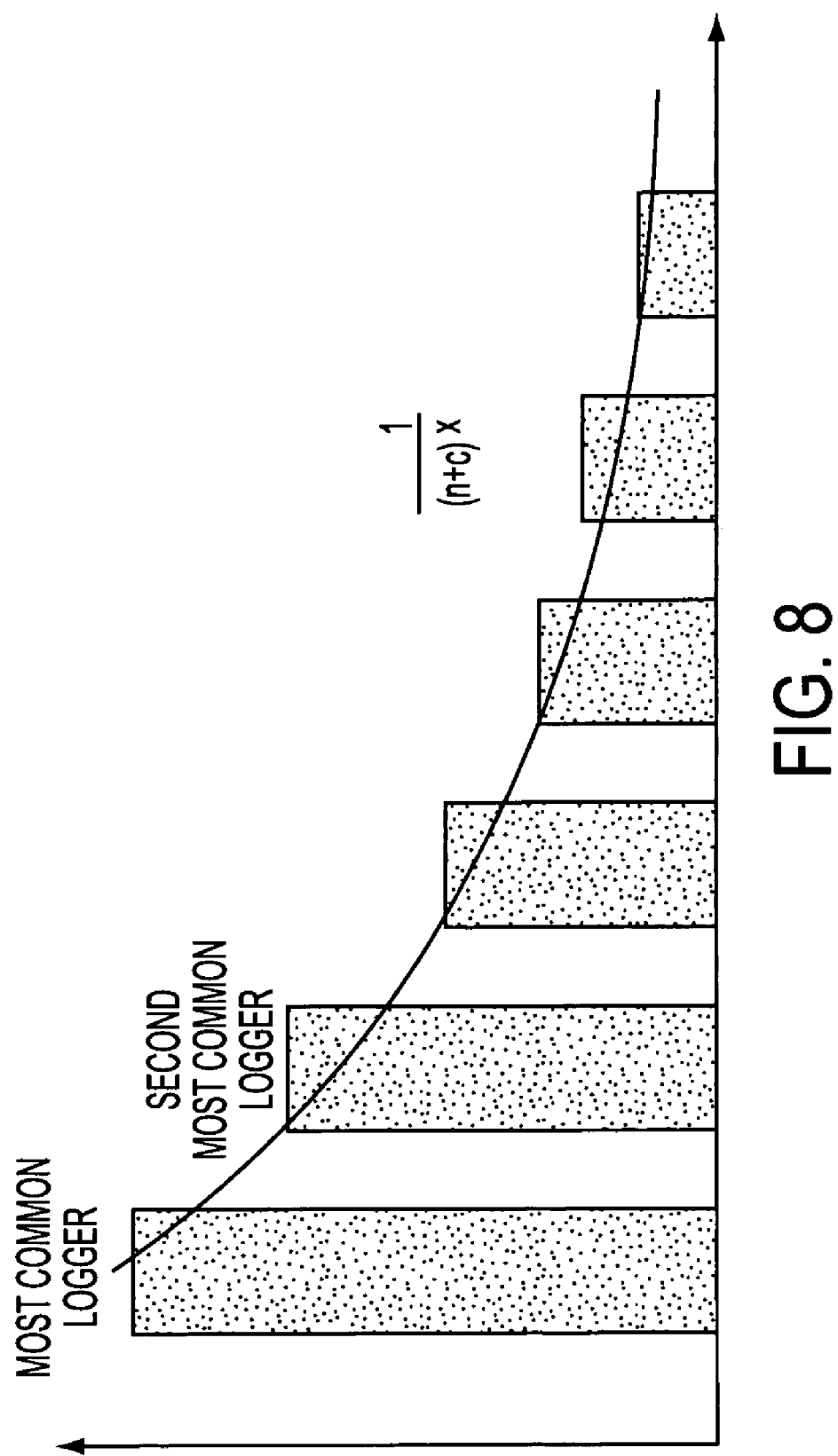
FIG. 8 is a bar chart showing distribution of fault types in a working system.

Reference is now made to FIG. 8, which is a simplified bar chart showing a Zipf-Estoup distribution of logged faults on a complex system with a curve fitted thereto. More particularly, the Zipf-Estoup distribution is a Mandelbrot generalization of the Zipf-Estoup law as discussed above, and reference is made to Communication Theory, Butterworths 1953—Pages 486–502, Paper #36, An Informational Theory of the Statistical Structure of Language—Benoit Mandelbrot, the contents of which are herein incorporated by reference.

Figure 9:
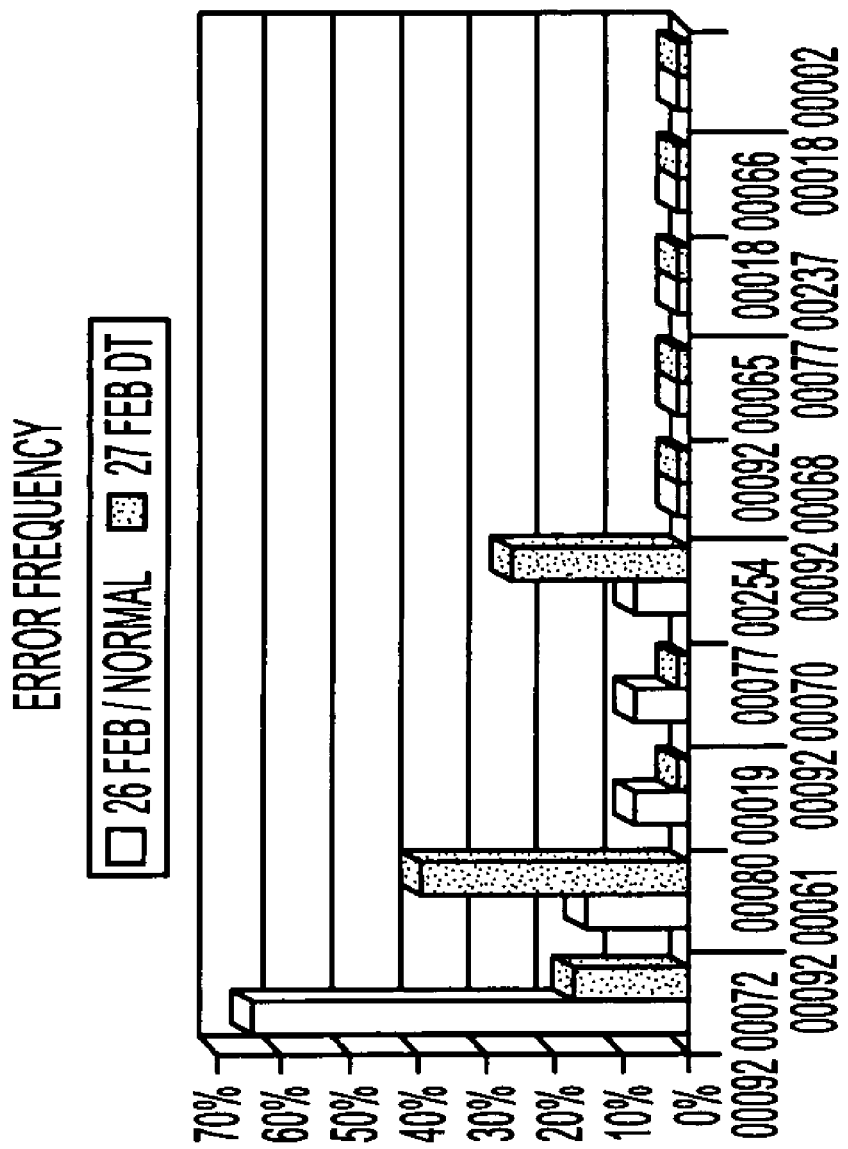
FIG. 9 is a flow chart showing two different distributions of fault types taken at different times for a given system, indicating the presence of a potential for system failure.

Reference is now made to FIG. 9, which is a bar chart showing measurements of logged faults taken from the same system at two different times. The first time is the average of three normal days and the second time is one "abnormal" day. It will be apparent that the distribution of faults for the first time follows the Zipf-Estoup law, whereas the distribution of faults for the second time does not. Furthermore there is a change in the ranking order for the second time. It is thus possible to infer a change in the system disorder level between the first time and the second time. Other signs of malfunction include an increase in the overall number of failure messages.

Figure 7:
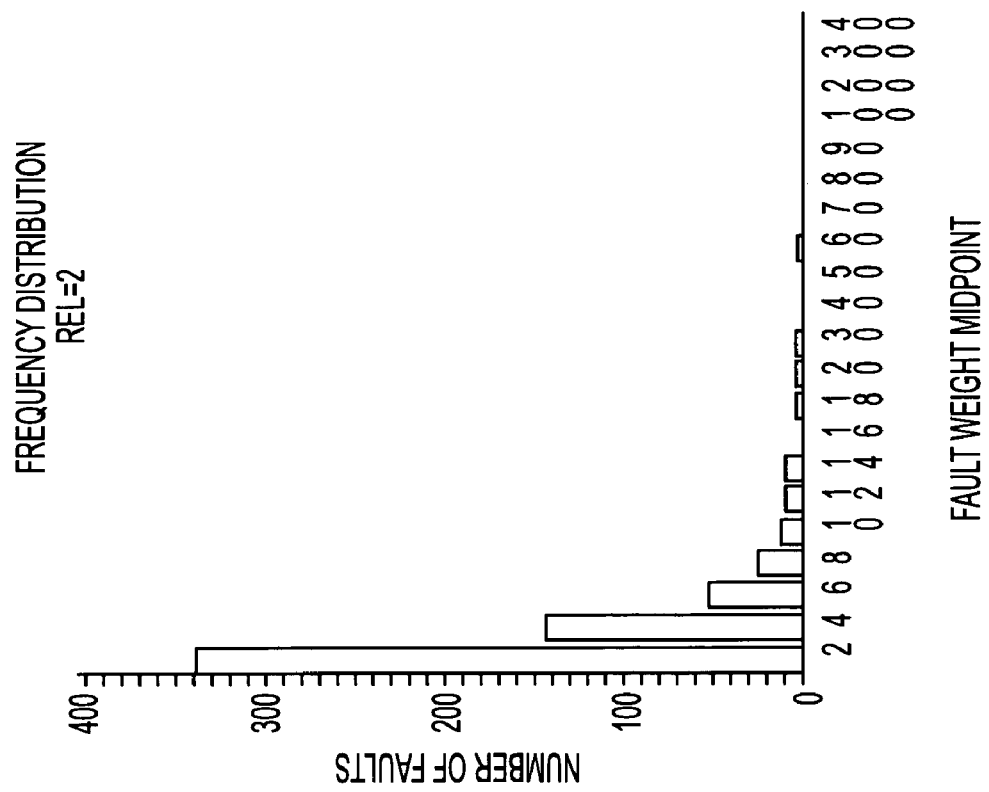
FIG. 7 is a bar chart showing a frequency distribution against number of occurrences of different fault types in a typical complex system.

The graphs of FIGS. 7–9 refer particularly to failure reports issued by software systems. The principle may however be applied to software systems which supply any kind of multi-message report.

In the above examples the system is a computer-based system. In the more general case of mechanical and electrical systems, including electronic systems, a useful disorder indicator is a level of heat or more particularly waste heat. The heat may be considered on its own or may be plotted against system load. Heat against system load may be expected to behave approximately according to the graph of FIG. 4.

Another widely applicable disorder indicator is sound or vibration, in particular sound emitted by a system. Often sound is used by engineers to get a feel for the presence of a problem, particularly in a mechanical system. The present embodiments allow sound to be analyzed against statistical measures. Sound intensity against system load may be expected to behave as with the graph of FIG. 4. Sound frequency may also be used in the analysis. Sound may be analyzed using sound spectrum analysis. The process of passing from order to chaos is itself often ordered and may be recognized by appropriate analysis of the sound spectrum.

The preferred embodiments thus provide a generalized tool for monitoring operation of a system. The tool may be applied to customized systems automatically without requiring any detailed knowledge of the system or of operating or failure modes. The monitoring operation is not affected by system complexity and thus avoids being too cumbersome for the more complex systems, as many bottom up solutions tend to become. The tool may be installed with little investment in terms of effort and cost since neither a detailed understanding of the system nor a lengthy training period is required. The alarm threshold is based on statistical data and thus may be adapted to the peculiarities of the particular system, controlling false alarm rates and also reducing the possibility of alarm cascades, which may occur in conventional systems when a variable hovers around a threshold value. Furthermore, because the system looks at deviant behavior rather than specific faults, and carries out consistent monitoring using statistical tools, it tends to give earlier predictions. For example, the system may provide alarms for the disorder indicator that behaves in a surge function pattern.

A tool according to the present embodiments is able to monitor a system or environment effectively without any need for the system being monitored to be thoroughly defined. That is to say it is effective in failure prediction even with poorly understood systems.

The end result of use of the tool is a prediction as to system failure. The prediction is non-specific in that it does not necessarily point to any particular type of failure, and the maintenance engineer is left to identify and solve whatever problems may be present.

Selection of the disorder indicator or features may be intuitive. A methodical way of making such a selection is to arrange possible failure modes, perhaps arranged in a fishbone diagram and to make a rigorous analysis of possible causes and effects. The feature to be measured as a disorder indicator for the given system may then be selected as a feature that is common to as many failure modes as possible.

Disorder measurement, that is to say measurement of a feature indicating a disorder level, is not restricted to system failure prediction but can also be used as a way of measuring device quality. For example a disorder indicator could be used in analysis of computer software to assign a quality score to the software.

It is appreciated that features described only in respect of one or some of the embodiments are applicable to other embodiments and that for reasons of space it is not possible to detail all possible combinations. Nevertheless, the scope of the above description extends to all reasonable combinations of the above described features.

The present invention is not limited by the above-described embodiments, which are given by way of example only. Rather the invention is defined by the appended claims.

We claim:

1. Apparatus for predicting failure in a system, the apparatus comprising:
   a measurement unit for repeatedly measuring a disorder indicator of said system, wherein the disorder indicator represents a non-designated output of said system, the non-designated output represents waste of said system, and
   a comparator for comparing obtained measurements of said disorder indicator with a predetermined statistical description of said disorder indicator to determine whether a deviation is present between presently measured values of said disorder indicator and said predetermined statistical description, said apparatus being operable to issue a failure prediction upon determination that such a deviation is statistically significant,
   wherein said disorder indicator provides non-specific failure indications.

2. Apparatus according to claim 1, wherein said measurement unit is operable to measure said disorder indicator via a communication link, thereby to monitor remotely located systems.

3. Apparatus according to claim 1, further comprising a communication unit for alerting a call center in the event of a failure prediction.

4. Apparatus according to claim 1, applicable to the system without regard to a level of complexity of said system.

5. The apparatus according to claim 1, wherein the apparatus is operable to determine whether to issue the failure prediction when the measured disorder indicator is not a normal distribution pattern.

6. The apparatus according to claim 1, wherein the apparatus is operable to determine whether to provide the non-specific failure indications when said measured disorder indicator behaves in a surge function pattern.

7. Apparatus for predicting failure in a system, the apparatus comprising:
   a measurement unit for repeatedly measuring a disorder indicator of said system, wherein the disorder indicator represents a non-designated output of said system, and the non-designated output represents waste of said system,
   a statistical unit for building up a statistical description of said disorder indicator using measurements taken via said measurement unit during a training phase of operation of said system, and
   a system thresholder, for using said statistical description to apply thresholds to said disorder indicator to predict system failure,
   wherein said disorder indicator provides failure indications of general abnormalities.

8. A method of failure prediction comprising:
   repeatedly measuring a disorder indicator of a system, wherein the disorder indicator represents a non-designated output of said system, and the non-designated output represents waste of said system, comparing said disorder indicator with a statistical description of idealized behavior of said disorder indicator, determining from said comparison whether a deviation is present in behavior of said disorder indicator, and issuing an alert in the event of determination of such a deviation being of statistical significance, wherein said disorder indicator provides non-specific failure indications based on a top down approach.

9. Method according to claim 8, wherein said measuring is carried out remotely.

10. Method according to claim 8, further comprising alerting a call center in the event of a failure prediction.

11. Method according to claim 8, wherein the method is applicable to the system without regard to a level of complexity of said system.

12. A method of failure prediction in a software system, the method comprising:

selecting a measurable indicator of a level of disorder in said software system, wherein said measurable indicator provides non specific failure indication, and is selected without detailed knowledge of said software system, obtaining a statistical description of behavior of said measurable indicator within said software system, repeatedly measuring said measurable indicator during operation of said software system, wherein said measurable indicator represents a non-designated output of said software system, comparing said measurable indicator with said statistical description, determining from said comparison whether a deviation is present in behavior of said measurable indicator, and issuing an alert in the event of determination of such a deviation being of statistical significance.

13. A data carrier having stored thereon computer executable instructions which when combined with a general purpose computer is operable to provide:

a measurement unit for repeatedly measuring a disorder indicator of a software system, wherein the disorder indicator represents a non-designated output of said software system and is a byproduct of operation of said software system, and a comparator for comparing obtained measurements of said disorder indicator with a predetermined statistical description of said disorder indicator to determine whether a deviation is present between presently measured values of said disorder indicator and said predetermined statistical description, said combination being operable to issue a failure prediction upon determination that such a deviation is statistically significant.

14. Apparatus for measuring quality of software operating in a system, the apparatus comprising:

a measurement unit for repeatedly measuring a disorder indicator of said system, wherein the disorder indicator represents a non-designated output of said system, and the non-designated output represents waste of said system, and a comparator for comparing obtained measurements of said disorder indicator with a predetermined statistical description of said disorder indicator to determine whether a deviation is present between presently measured values of said disorder indicator and said predetermined statistical description, said apparatus being operable to issue a quality score of said software based on an extent of said deviation, wherein said disorder indicator gives statically viable but non-specific failure indications.

15. A method for predicting failure in a computing system comprising:

automatically determining a disorder indicator representing waste that said computing system produces;

repeatedly measuring the disorder indicator of said computing system;

comparing obtained measurements of said disorder indicator with a predetermined statistical description of said disorder indicator to determine whether a deviation is present between presently measured values of said disorder indicator and said predetermined statistical description, wherein said disorder indicator predicts faults that are a result of ill-defined or unexpected phenomena; and issuing a failure prediction upon determination that such a deviation is statistically significant.

16. The method according to claim 15, wherein said disorder indicator is determined without any detailed knowledge of said computing system.

17. The method according to claim 16, wherein said disorder indicator is determined without any detailed knowledge of operation of said computing system.

18. The method according to claim 17, wherein said disorder indicator is determined without any detailed knowledge of failure modes of said computing system.

19. The method according to claim 15, wherein said automatically determining a disorder indicator comprises: observing the computing system for patterns in a behavior of said computing system that are indicative of faults.

20. The method according to claim 15, wherein said computing system is a customized computing system.

21. The method according to claim 15, wherein measuring said disorder indicator comprises measuring a number of failure messages, and wherein the deviation is present when an overall number of messages statistically significantly increases.

22. The method according to claim 15, wherein measuring said disorder indicator comprises measuring a number of logged faults, and wherein the measured number of logged faults are compared with an average distribution of the logged faults.

23. The method according to claim 15, wherein measuring said disorder indicator comprises measuring heat produced by said computing system and an overall load of said computing system, wherein for said comparison said measurement of said produced heat is adjusted based on said measurement of said overall load of said computing system.

24. The method according to claim 15, wherein measuring said disorder indicator comprises measuring internal system load produced by a central processing unit and an external system load produced by a messaging signaling unit, wherein for said comparison said measurement of said produced internal system load is adjusted based on said measurement of said external load of said computing system.

25. The method according to claim 15, wherein measuring said disorder indicator comprises measuring an amount of time a system resource is devoted to a particular task.

26. The method according to claim 15, wherein said computing system is a local area network system, and wherein in predicting failures said local area network system uses said disorder indicator in a top down approach.

* * * * *